(12) United States Patent
Tang et al.

(10) Patent No.: US 10,554,868 B2
(45) Date of Patent: Feb. 4, 2020

(54) CAMERA MODULE AND MOBILE TERMINAL

(71) Applicant: GUANGDONG OPPO MOBILE TELECOMMUNICATIONS CORP., LTD., Dongguan, Guangdong (CN)

(72) Inventors: Yimei Tang, Guangdong (CN); Yi Sun, Guangdong (CN); Jingming Wan, Guangdong (CN); Xinquan Zhou, Guangdong (CN); Haijin Hu, Guangdong (CN); Guangwei Zhang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/861,776

(22) Filed: Jan. 4, 2018

(65) Prior Publication Data
US 2018/0198897 A1    Jul. 12, 2018

(30) Foreign Application Priority Data

Jan. 11, 2017    (CN) .......................... 2017 1 0021133

(51) Int. Cl.
*H04N 5/225*    (2006.01)
*H04M 1/02*    (2006.01)
*G02B 13/00*    (2006.01)

(52) U.S. Cl.
CPC ....... *H04N 5/2258* (2013.01); *G02B 13/0065* (2013.01); *H04M 1/0264* (2013.01);
(Continued)

(58) Field of Classification Search
CPC ............. H04N 5/2251; H04N 5/22521; H04N 5/2253; H04N 5/2254; H04N 5/2257;
(Continued)

(56) References Cited

U.S. PATENT DOCUMENTS

2005/0253951 A1*    11/2005    Fujimoto ............. H04N 5/2253
    348/335
2008/0100719 A1    5/2008    Huang
(Continued)

FOREIGN PATENT DOCUMENTS

CN    201007754 Y    1/2008
CN    102762069 A    10/2012
(Continued)

OTHER PUBLICATIONS

International Search Report and Written Opinion dated Mar. 26, 2018 for Application No. PCT/CN2017/119687.
(Continued)

*Primary Examiner* — Paul M Berardesca
(74) *Attorney, Agent, or Firm* — Ladas & Parry LLP

(57) ABSTRACT

A camera module and a mobile terminal are disclosed. The camera module includes a first camera module, a second camera module and a bracket; the first camera module is arranged side by side with the second camera module, the second camera module is connected to the bracket so as to be grounded, a connector is provided between the first camera module and the second camera module, and the first camera module is electrically connected to the second camera module via the connector so as to be grounded through the bracket. By a connector provided between the first camera module and the second camera module, the first camera module is electrically connected to the second camera module, and achieves common grounding through the bracket at the side of the second camera module.

17 Claims, 5 Drawing Sheets

(52) U.S. Cl.
CPC ......... *H04N 5/2254* (2013.01); *H04N 5/2257* (2013.01); *H04N 5/22521* (2018.08)

(58) Field of Classification Search
CPC ............... H04N 5/2258; H04M 1/0264; G02B 13/0065–007
See application file for complete search history.

(56) References Cited

U.S. PATENT DOCUMENTS

| | | | | |
|---|---|---|---|---|
| 2008/0135728 | A1* | 6/2008 | Yang | H01L 27/14618 250/208.1 |
| 2010/0103296 | A1* | 4/2010 | Nakagiri | H01L 27/14618 348/294 |
| 2013/0033581 | A1* | 2/2013 | Woo | H04N 5/2257 348/47 |
| 2013/0141541 | A1 | 6/2013 | Jung et al. | |
| 2015/0288865 | A1* | 10/2015 | Osborne | H04N 5/2624 348/218.1 |
| 2016/0044247 | A1* | 2/2016 | Shabtay | H04N 5/23296 348/240.3 |
| 2017/0131526 | A1* | 5/2017 | Park | G02B 13/0065 |
| 2018/0024329 | A1* | 1/2018 | Goldenberg | G02B 13/16 359/557 |

FOREIGN PATENT DOCUMENTS

| | | |
|---|---|---|
| CN | 203289498 U | 11/2013 |
| CN | 204408470 U | 6/2015 |
| CN | 104902723 A | 9/2015 |
| CN | 105050360 A | 11/2015 |
| CN | 205017673 U | 2/2016 |
| CN | 105762782 A | 7/2016 |
| CN | 205647691 U | 10/2016 |
| CN | 106534655 A | 3/2017 |
| EP | 2 015 565 A2 | 1/2009 |
| EP | 2 202 959 A2 | 6/2010 |
| EP | 2 916 527 A1 | 9/2015 |

OTHER PUBLICATIONS

European Search Report dated May 2, 2018 for Application No. EP 18 15 0322.
English abstract of CN 106534655 A.
English abstract of CN 102762069 A.
English abstract of CN 201007754 Y.
English abstract of CN 204408470 U.
English abstract of CN 205647691 U.
English abstract of CN 105762782 A.
English abstract of EP 2 202 959 A2.
English abstract of EP 2 916 527 A1.
English abstract of EP 2 015 565 A2.

* cited by examiner

CAMERA MODULE AND MOBILE TERMINAL

CROSS REFERENCE TO RELATED APPLICATION

This application claims the priority benefit of Chinese Patent Application No. 201710021133.0, titled "CAMERA MODULE AND MOBILE TERMINAL" and filed on Jan. 11, 2017, the contents of which are incorporated by reference herein in their entirety for all purposes.

TECHNICAL FIELD

The present disclosure relates to the field of mobile terminal technology, and particularly to a camera module and mobile terminal.

BACKGROUND TECHNOLOGY

With the rapid development of mobile terminal technology, mobile terminals are widely used and become indispensable equipments in daily lives. Mobile terminals can be used to take lessons, get entertainment, take photos, etc.

The mobile terminal currently used may have dual camera modules, including a first camera module and a second camera module. In order to discharge the static electricity generated by the first and camera modules during operation, it is necessary to provide brackets respectively at the first camera module side and the second camera module side to achieve grounding to timely and effectively discharge the static electricity.

However, the above design may lead to complicated process, and the need to set two ground brackets, thereby increasing the cost.

SUMMARY

Embodiments of the present disclosure provide a camera module and a mobile terminal. By a connector provided between the first camera module and the second camera module, the first camera module is electrically connected to the second camera module, and achieves a common grounding through the bracket on the second camera module side. Thus, it is possible to simplify the process, reduce the cost, discharge the generated static electricity in a timely and effective way, while enhancing the overall strength, stability, functional reuse of the camera module, as well as improving the overall efficiency of the camera module of the mobile terminal.

According to an aspect, a camera module is provided. The camera module includes a first camera module, a second camera module, a bracket and a connector. The second camera module is arranged side by side with the first camera module. The bracket is connected to the second camera module to allow the second camera module to be grounded. The connector is provided between the first camera module and the second camera module. The first camera module is electrically connected to the second camera module via the connector so as to be grounded through the bracket.

According to another aspect, a mobile terminal is provided. The mobile terminal includes a case and a camera module disposed in the case; the camera module is a camera module described in the above.

According to yet another aspect, a camera module is provided. The camera module includes a first camera module and a second camera module. The second camera module is arranged side by side with the first camera module. The second camera module includes a second camera, a light guide and a frame. The second camera and the light guide are accommodated and fixed by the frame. The light guide is disposed between the first camera module and the second camera.

Other features of the technology will be apparent from consideration of the information contained in the following detailed description.

BRIEF DESCRIPTION OF THE DRAWINGS

For better illustration, a brief description of the accompanying drawings used herein is given below. It is to be understood that the drawings listed below are only examples without construed as limitation to the scope of the disclosure.

DETAILED DESCRIPTION OF THE EMBODIMENTS

Figure 1:
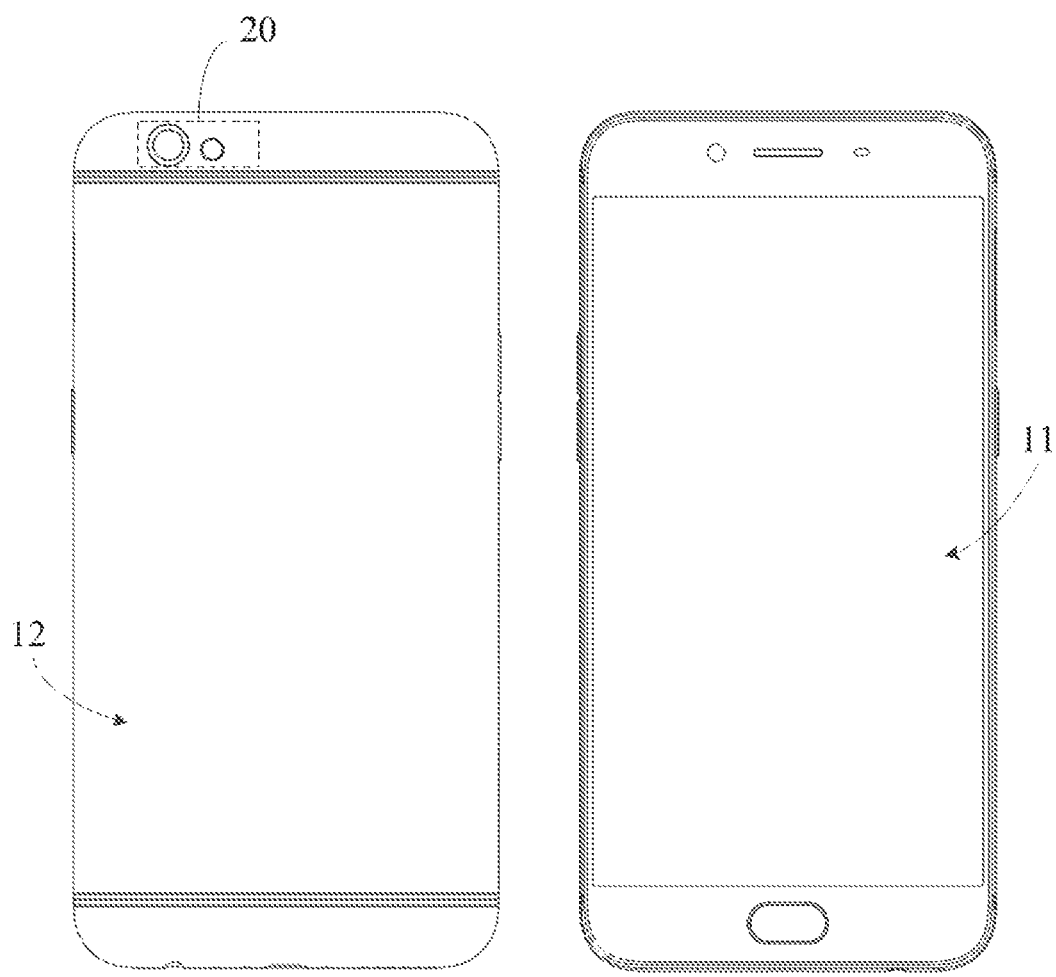
FIG. 1 is a structural schematic diagram of a mobile terminal according to an embodiment of the disclosure.

Please refer to the drawings, in which like reference numerals refer to like elements, and the principles of the disclosure are illustrated by the practice in a suitable environment. The following description is based on the specific embodiments of the disclosure as exemplified and should not be construed as limiting other specific embodiments of the disclosure which are not detailed herein.

The term "embodiment" as used in this specification is intended to be used as an example or illustration. In addition, the article "a/an" as used in this specification and the appended claims may generally be construed to mean "one or more" unless otherwise specified or directed from the context clearly to the singular.

In the description of the present disclosure, it is to be understood that the azimuthal or positional relationships indicated by the terms, including "center", "longitudinal", "lateral", "length", "width", "thickness", "upper", "lower", "front", "rear", "left", "right", "vertical", "horizontal", "top", "bottom", "internal", "external", "clockwise", "counterclockwise", etc., are based on the drawings, and are merely for the purpose of facilitating the description and simplification of the description, rather than indicating or implying that the device or element referred to must have a specific orientation, constructed and operated in a particular orientation. Therefore, they cannot be construed as limiting the present disclosure.

In the description of the present disclosure, unless otherwise specified and defined, the terms "install", "connect" and "connection" should be understood in a broad sense. For example, fixed connected, removable connected or integrally connected; mechanically connected, electrically connected or communicating with each other; directly connected or indirectly connected by intermediate medium; internal connection of two elements or interaction relationship thereof. The specific meaning of the above terms in the present disclosure can be understood by those skilled in the art in light of specific circumstances.

In addition, unless otherwise expressly stated and defined, the description of the first feature "above" or "blow" the second feature includes direct contact of the first and the second features, as well as indirect contact of the two through other features between them. Moreover, the description of the first feature "above", "over" and "on top of" the second feature includes the situation that the first feature is just above or obliquely above the second feature, or simply indicating that the first feature is higher than the second feature. The description of the first feature "under" and "below" the second feature includes the situation that the first feature is just below or obliquely below the second feature, or simply indicating that the first feature is lower than the second feature.

The following disclosure provides a number of different embodiments or examples for implementing the different structures of the present disclosure. In order to simplify the disclosure of the present disclosure, components and arrangements of specific examples are described below. They are merely exemplary and are not intended to limit the disclosure. In addition, the present disclosure may repeat the reference numerals and/or reference numerals in different examples, for the sake of simplicity and clarity, which in itself does not indicate the relationship between the various embodiments and/or arrangements discussed. In addition, the present disclosure provides examples of various specific processes and materials, but those of ordinary skill in the art will appreciate the use of other processes and/or other materials.

FIG. 1 is a structural schematic diagram of a mobile terminal according to an embodiment of the disclosure. For convenience of explanation, only portions related to the embodiments of the present disclosure are shown.

The mobile terminal includes a case, a printed circuit board 300 and a camera module 20. The camera module 20 and the printed circuit board 300 are all disposed in the case. The camera module 20 and the printed circuit board are electrically connected.

Figure 2:
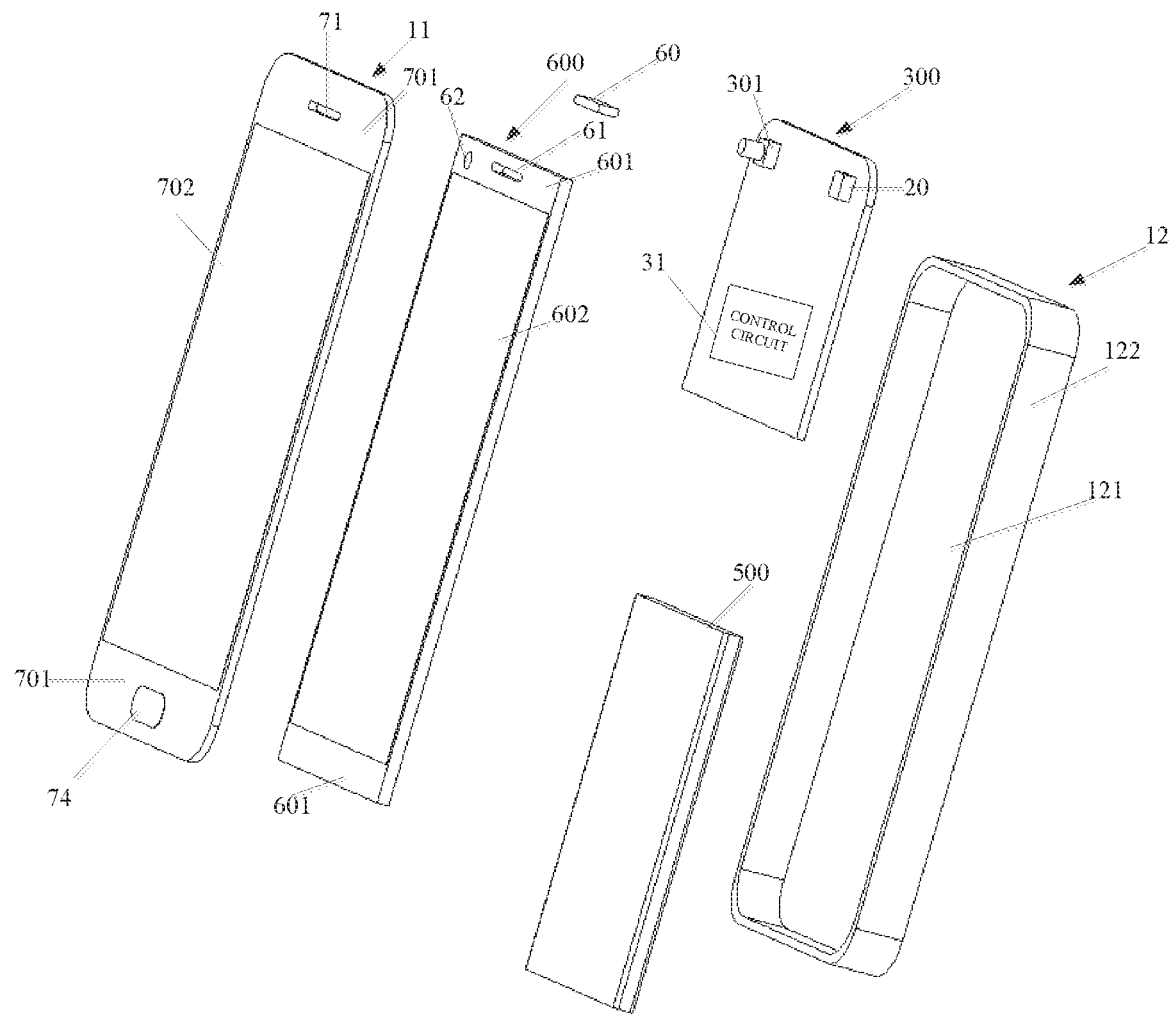
FIG. 2 is an exploded diagram of a mobile terminal according to an embodiment of the disclosure.

Referring to FIG. 2, in some embodiments, the case includes a front cover 11 and a rear cover 12. A space is enclosed by the front cover 11 and the rear cover 12. The camera module 20 and the printed circuit board 300 are disposed in the space. The camera module 20 is fitted on the rear cover 12.

The mobile terminal of the embodiment further includes battery 500 and a display screen 600.

The battery 500 is mounted in the rear cover 12 and is electrically connected to the printed circuit board 300 to supply power to the printed circuit board 300.

The display screen 600 is disposed between the rear cover 12 and the front cover 11. The printed circuit board 300 is mounted on the rear cover 12. The rear cover 12 includes a body 121 and a side wall 122 provided at the periphery of the body. The side wall 122 extends towards the front cover 11.

The printed circuit board 300 is provided with a front camera module 301 and a rear camera module (i.e., camera module 20). The position of the front camera module 301 corresponds to the position of the front camera hole 62. The printed circuit board 300 further includes a control circuit 31, which may be a main board. The control circuit 31 may be electrically connected to the receiver 60, the front camera module 301, the camera module 20 and the fingerprint identification module 74 to achieve overall monitoring of the mobile terminal.

The display panel 600 is mounted under the front cover 11. The display screen 600 includes a non-display area 601 and a display area 602. The top non-display area 601 is provided with an opening 61 for the receiver to emit a sound, and a front camera hole 62.

In some embodiments, the front camera hole 62 may be omitted, or removed.

The front cover 11 includes a non-display area 701 and a display area 702. The front cover 11 may be made of a material such as glass, ceramic or sapphire, etc. The display area 702 of the front cover 11 may be used for displaying an image or for a user to perform touch operation or the like. The non-display area 701 of the front cover 11 includes a top non-display area and a bottom non-display area. The non-display area at the top corresponds to an opening 71 for the receiver to emit a sound. A fingerprint identification module 74 is provided on the non-display area 712 at the bottom. The fingerprint identification module 74 may be used to acquire the fingerprint information of the user. Ink is provided underneath the transparent glass corresponding to the non-display area 601 other than the opening 71 for the receiver and the front camera hole 62, so as to cover the internal structure of the mobile terminal.

Figure 3:
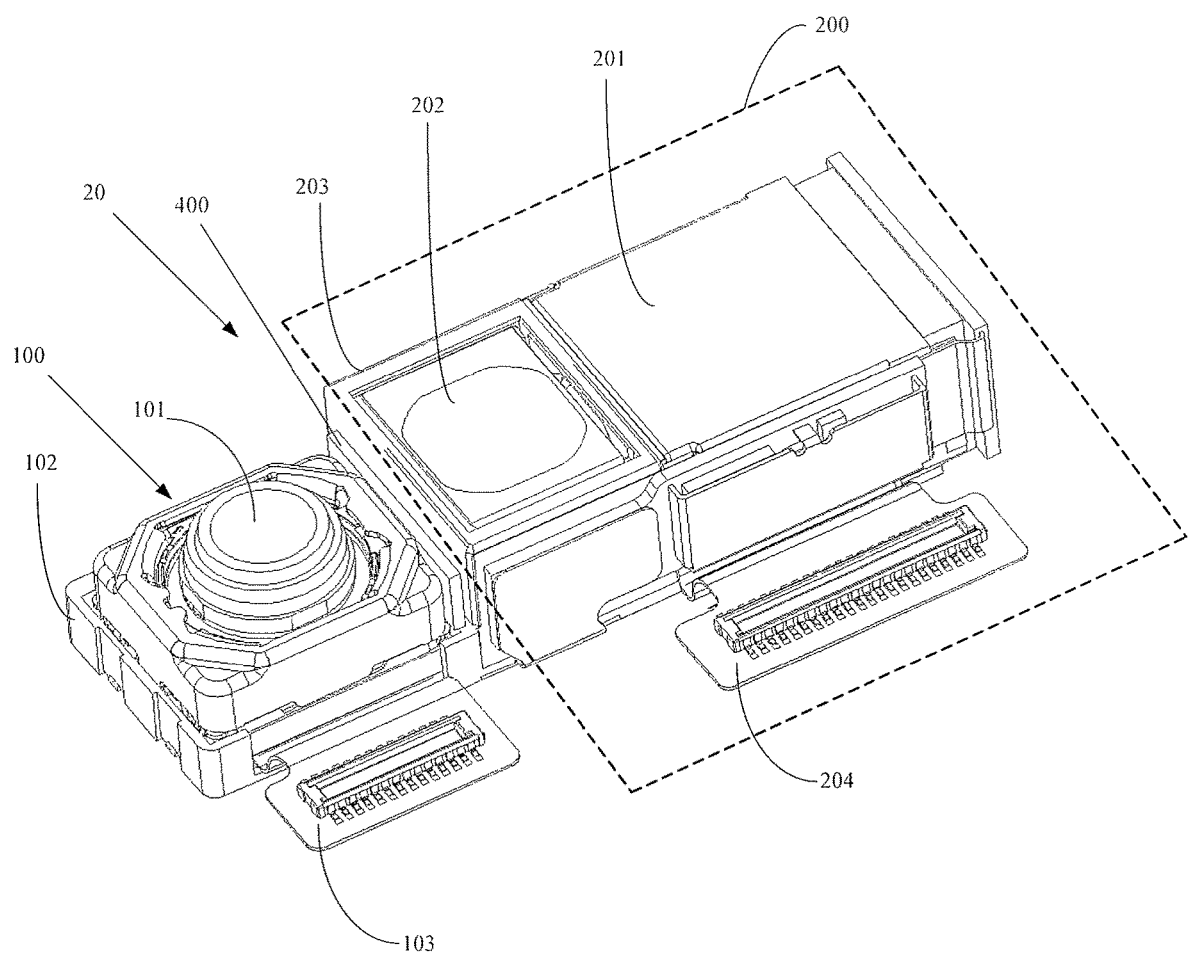
FIG. 3 is a dimensional structural diagram of a camera module according to an embodiment of the disclosure.

FIG. 3 is a dimensional structural diagram of a camera module according to an embodiment of the disclosure. For convenience of explanation, only portions related to the embodiments of the present disclosure are shown.

The camera module 20 includes a first camera module 100, a second camera module 200 and a bracket. The first camera module 100 and the second camera module 200 are arranged side by side. The second camera module 200 is connected to the bracket to achieve a ground setting. A connector 400 is provided between the first camera module 100 and the second camera module 200. The first camera module 100 is electrically connected to the second camera module 200 via the connector 400 to achieve a ground setting via the bracket.

In an embodiment, the first camera module 100 includes a first camera 101 and a base 102 carrying the first camera 101, as well as a first FPC (Flexible Printed Circuit) 103. The first FPC 103 and the first camera 101 are electrically connected. The lens of the first camera 101 is provided in a direction towards the back cover of the mobile terminal, and the first camera 101 is for capturing an image at the rear of the mobile terminal. However, it is to be understood that the base 102 may be made of plastic material.

In an embodiment, the second camera module 200 includes a second camera 201, a light guide 202, a frame 203 and a second FPC 204. The frame 203 is for accommodating and fixing the second camera 201 and the light guide 202. The second camera 201 and the light guide 202 are arranged side by side, and the second camera 201 and the second FPC 204 are electrically connected.

However, it is to be understood that the frame 203 may be made of metal. In the embodiment, the light guide 202 is realized by a prism.

In an embodiment, the frame 203 made of metal is connected to the bracket, and the bracket abuts to the case of the mobile terminal to achieve a grounding setting. In this way, the static electricity generated by the second camera module 200 during operation can be discharged in a timely and effective manner.

The light exit surface of the light guide 202 is in a direction towards the rear cover of the mobile terminal, and the camera lens of the second camera 200 is towards the light guide 202. The outside light is transmitted to the second camera through the light guide 202 so that the second camera can capture an image of the rear of the mobile terminal.

In the embodiment, when assembling the first camera module 100 and the second camera module 200, the first camera module 100 can be arranged side by side with the second camera module 200 in order to reduce the overall thickness of the camera module without increasing the thickness of the mobile terminal, in view that the length of the second camera 201 is greater than that of the first camera 101. Detailed description of the arrangement is as follows.

The light exit surface of the second camera 201 is arranged in a direction towards the first camera module 100, i.e., the light exit surface of the second camera 201 is towards the light guide 202. The light exit surface of light guide 202 is in parallel with the light exit surface of the first camera module 100, and the light guide 202 is disposed between the first camera module 100 and the second camera 201. The base 102 of the first camera module 100 abuts the second camera module 200. For example, the base 102 of the first camera module 100 and the frame 203 of the second camera module 200 are stitched at the bottom by glue, so that there is a gap between the first camera module 100 and the second camera 200, and no electrical conduction is achieved therebetween. As a result, the static electricity generated during operation of the first camera module 100 cannot be discharged. In this embodiment, the connector 400 is provided at the gap position. In this way, the metal housing of the first camera is electrically connected to the metal frame 203 of the second camera module 200 via the connector 400, and is then provided with a common grounding through the bracket on the second camera module side. Thus, the static electricity generated during operation of the first camera module 100 can be discharged by commonly using the bracket on the second camera module side.

In some embodiments, the connector 400 is disposed on the base and interposed between the first camera and the second camera module. Furthermore, the connector 400 is interposed between the first camera module and the light guide.

Structure of the connector 400 will now be described in detail.

Figure 4:
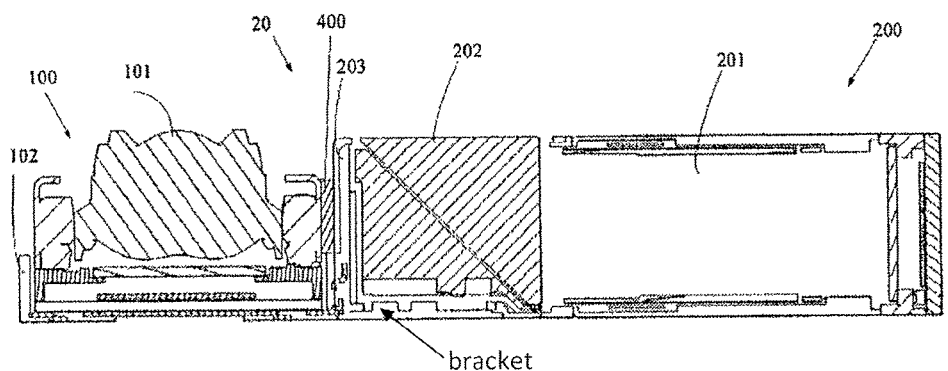
FIG. 4 is a sectional diagram of a camera module according to an embodiment of the disclosure.

FIG. 4 is a sectional diagram of a camera module 20 according to the embodiment of the disclosure. The camera module 20 includes a first camera module 100, a second camera module 200 and a bracket. A connector 400 is provided between the first camera module 100 and the second camera module 200. The first camera module 100 includes a first camera 101, a base 102, and a first FPC (Flexible Printed Circuit) 103 (not shown). The second camera module 200 includes a second camera 201, a light guide 202, a frame 203 and a second FPC 204 (not shown). The frame 203 is for accommodating and fixing the second camera 201 and the light guide 202. The second camera 201 and the light guide 202 are arranged side by side.

As an embodiment of the disclosure, the connector 400 is a conductive metal sheet. For example, a conductive metal sheet, such as a steel sheet, is interposed in the gap between the first camera module 100 and the second camera module 200. The steel sheet is bonded to the first camera module 100 and the second camera module 200 by conductive adhesive to achieve electrical conduction between the first camera module 100 and the second camera module 200, which are then grounded through a common bracket. That is, the design of the steel sheet, while achieving the overall grounding, also enhances the strength of the camera module as a whole.

In a preferred embodiment, in order to securely fix the connector 400 on the base, a first fastener and a second fastener are respectively provided at both ends of a bottom of the connector for securely fastening the connector.

The connectors with different structures according to some embodiments, together with the corresponding structural components, will now be described with reference to FIGS. 5 to 7. For the sake of clarity, the components and features that are differentiated in these embodiments will be described in detail, and description to the structure of the camera module 20 will be omitted.

Figure 5:
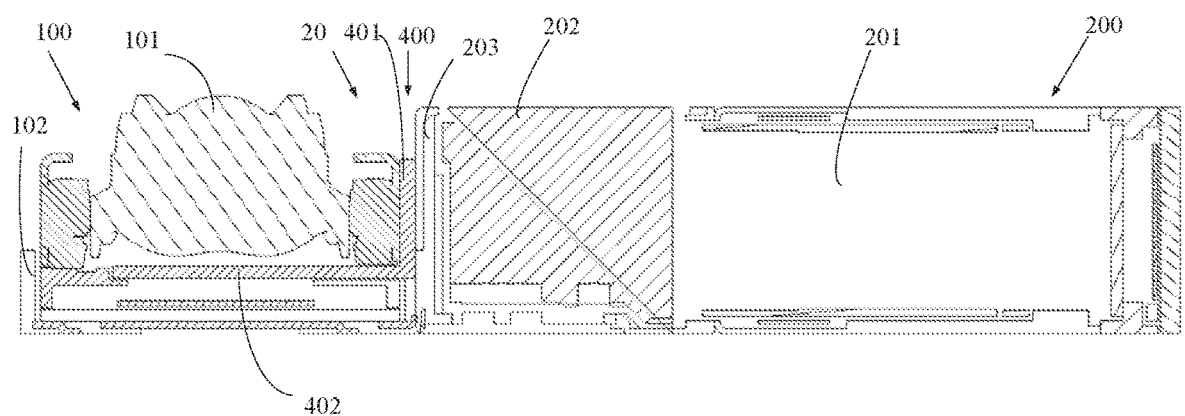
FIG. 5 is a sectional diagram of a camera module illustrating a structure of a connector according to an embodiment of the disclosure.

FIG. 5 illustrates a structure of the connector in an embodiment. The connector 400 includes a gripping portion 401 and a carrier portion 402 bent and extending from the gripping portion. The first camera module performs heat dissipation through the carrier portion 402, and is electrically connected to the second camera module via the gripping portion 401. For example, the connector is of "L" shape. For example, the bottom of the first camera module 100 is provided with a heat dissipating sheet made of metal, having an "L" shape as a whole. That is, the heat dissipating sheet extends from the bottom of the first camera module 100 towards the second camera module 200, and is bent upwardly to obtain the gripping portion 401. Thus, the first camera module can perform heat dissipation through the gripping portion 402, while the first camera module and the second camera module are electrically connected via the gripping portion 401. In this way the overall strength and stability of the camera module are enhanced.

However, it is to be understood that the carrier portion 402 may abut the case of the mobile terminal so as to be grounded, thereby both the first camera module and second camera module are grounded, so as to timely and effectively discharge the static electricity generated by the first camera module 100 during operation.

Figure 6:
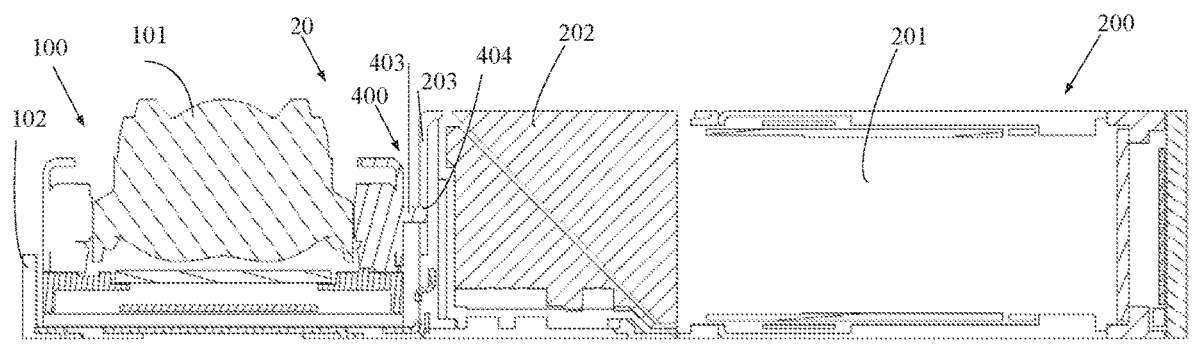
FIG. 6 is a sectional diagram of a camera module illustrating a structure of another connector according to an embodiment of the disclosure.

FIG. 6 illustrates another structure of the connector in an embodiment. The connector 400 includes a protrusion 403 extending from the first camera module in a direction towards the second camera module, the second camera module is provided with a groove 404 corresponding to the protrusion, and the protrusion 403 is fitted in the groove 404 to form an electrical connection of the first camera module 100 and second camera module 200.

It is to be understood that the connector 400 is integrally formed with a housing of the first camera module. That is, the connector 403 is integrally formed with a housing of the first camera module. The groove 404 is provided in the frame 203 of the second camera module, and the protrusion 403 is fitted in the groove 404 to form an electrical connection of the first camera module 100 and second camera module 200.

Figure 7:
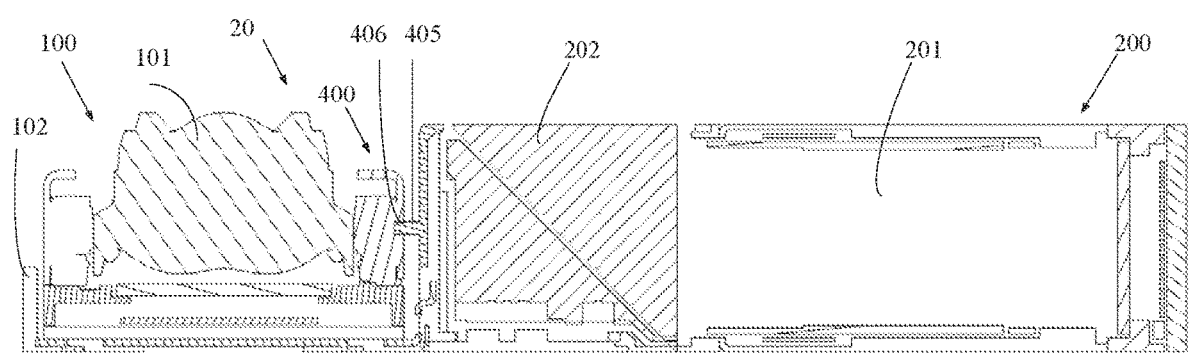
FIG. 7 is a sectional diagram of a camera module illustrating a structure of yet another connector according to an embodiment of the disclosure.

FIG. 7 illustrates yet another structure of the connector in an embodiment. The connector 400 includes a protrusion 405 extending from the second camera module in a direction towards the first camera module, the first camera module is provided with a groove 406 corresponding to the protrusion, and the protrusion is fitted in the groove to form an electrical connection of the first camera module and second camera module.

However, it is to be understood that the protrusion 405 is shaped by extending from a side of the frame where the light guide locates in a direction towards the first camera module. Furthermore, the protrusion 405 is integrally formed with the frame. For example, the protrusion 405 is integrally formed with the frame of the second camera module. The groove 406 is provided in the housing of the first camera module, and the protrusion 405 is fitted in the groove 406 to form an electrical connection of the first camera module and second camera module, In the embodiments, the working principle of the camera module is as follows.

When photographing, the first camera module 100 is called and is used as a wide angle camera. The scene behind the mobile terminal is projected by the optical image generated by the lens of the first camera module 100 to the surface of the image sensor, and then converted into electrical signals. After analog-digital conversion, a digital image signal is generated and sent to the digital signal processing chip, and a first image is obtained. The first camera module 200 is called and is used as a telephoto camera. The outside light is transmitted to the second camera through the light guide 202, so that the scene behind the mobile terminal is projected by the optical image generated by the lens of the second camera module 200 to the surface of the image sensor, and then converted into electrical signals. After analog-digital conversion, a digital image signal is generated and sent to the digital signal processing chip, and a second image is obtained. At last, the first image and the second image are subjected to fusion processing to obtain a resultant final image.

During photographing, the static electricity generated by the first camera module 100 and the second camera module 200 can be discharged through the bracket on the second camera module side. Thus, it is possible to discharge the static electricity generated in a timely and effective way.

In summary, the camera module and a mobile terminal are provided. The camera module includes a first camera module, a second camera module and a bracket; the first camera module is arranged side by side with the second camera module, the second camera module is connected to the bracket so as to be grounded, a connector is provided between the first camera module and the second camera module, and the first camera module is electrically connected to the second camera module via the connector so as to be grounded through the bracket. By a connector provided between the first camera module and the second camera module, the first camera module is electrically connected to the second camera module, and achieves a common ground setting through the bracket at the side of the second camera module. Thus, it is possible to simplify the process, reduce the cost, discharge the generated static electricity in a timely and effective way, while enhancing the overall strength, stability, functional reuse of the camera module, as well as improving the overall efficiency of the camera module of the mobile terminal.

While the present disclosure has been illustrated and described with respect to one or more implementations, it will be apparent to those skilled in the art that equivalent variations and modifications will occur to based on reading and understanding of the present specification and drawings. The disclosure includes all such modifications and variations, and is limited only by the scope of the appended claims. In particular, with respect to the various functions performed by the above-described components, the terminology used to describe such a component is intended to correspond to any component (unless otherwise indicated) that performs a specified function of the component (e.g., it is functionally equivalent), even if they are not structurally equivalent to the public structure of the functions in the exemplary implementation of the present specification as shown herein. In addition, although the particular features of the specification have been disclosed with respect to only one of several implementations, such features may be combined with one or more other features of other implementations that may be desirable and advantageous for a given or specific application. Also, with regard to the terms "including", "having", "containing", or their variations used in the specific embodiments or claims, they are intended to "limit" in a way similar to the term "comprising".

In view of the foregoing, although the present disclosure has been disclosed by way of preferred embodiments, the above-described preferred embodiments are not intended to limit the present disclosure. It will be apparent to those skilled in the art that various changes and modifications may be made therein without departing from the spirit and scope of the disclosure. The scope of protection of the present disclosure is defined by the scope of the claims.

What is claimed is that:

1. A camera module, comprising:
    a first camera module, wherein the first camera module comprises a first camera and a base for carrying the first camera, the base is made of a plastic material;
    a second camera module, arranged side by side with the first camera module, wherein the second camera module comprises a second camera, a light guide and a frame, the frame accommodating and fixing the second camera and the light guide, the light guide is disposed between the first camera module and the second camera, the frame is made of a metal material;
    a bracket, connected to the second camera module to allow the second camera module to be grounded; and
    a connector, provided between the first camera module and the light guide of the second camera module,
    wherein the base is configured to abut the second camera module, the first camera module is electrically connected to the second camera module via the connector so as to be grounded through the bracket.

2. The camera module of claim 1, wherein the connector is a conductive metal sheet.

3. The camera module of claim 1, wherein the connector comprises a gripping portion and a carrier portion bent and extending from the gripping portion, the first camera module performs heat dissipation through the carrier portion, and is electrically connected to the second camera module via the gripping portion.

4. The camera module of claim 3, wherein the connector is of an "L" shape.

5. The camera module of claim 1, wherein the connector comprises a protrusion extending from the first camera module in a direction towards the second camera module, the second camera module is provided with a groove corresponding to the protrusion, and the protrusion is fitted in the groove to form an electrical connection of the first camera module and second camera module.

6. The camera module of claim 1, wherein the connector is integrally formed with a housing of the first camera module.

7. The camera module of claim 1, wherein the connector is disposed on the base and interposed between the first camera and the second camera module.

8. The camera module of claim 1, wherein the connector comprises a protrusion extending from the second camera module in a direction towards the first camera module, the first camera module is provided with a groove corresponding to the protrusion, and the protrusion is fitted in the groove to form an electrical connection of the first camera module and second camera module.

9. The camera module of claim 8, wherein the protrusion is shaped by extending from a side of the frame where the light guide locates in a direction towards the first camera module.

10. The camera module of claim 9, wherein the protrusion is integrally formed with the frame.

11. The camera module of claim 1, wherein the second camera is arranged with a light exit surface thereof in a direction towards the first camera module, and the light guide is arranged with a light exit surface thereof in parallel with the light exit surface of the first camera module.

12. The camera module of claim 11, wherein the second camera has a length greater than the first camera.

13. The camera module of claim 1, wherein the light guide is a prism.

14. The camera module of claim 1, wherein the camera module further comprises a first fastener and a second fastener;
the first fastener and the second fastener are respectively located at both ends of a bottom of the connector for securely fastening the connector.

15. A mobile terminal, comprising a case and a camera module disposed in the case, the camera module being a camera module of claim 1.

16. A camera module, comprising:
a first camera module, wherein the first camera module comprises a first camera and a base for carrying the first camera, the base is made of a plastic material;
a second camera module, arranged side by side with the first camera module;
wherein the second camera module comprises a second camera, a light guide and frame, the frame accommodating and fixing the second camera and the light guide, the light guide is disposed between the first camera module and the second camera;
a connector is provided between the first camera module and the light guide of the second camera module; and
the first camera module is electrically connected to the second camera module via the connector.

17. The camera module of claim 16, where the second camera module comprises a second camera, the second camera has a length greater than the first camera, the second camera is arranged with a light exit surface thereof in a direction towards the first camera module, and the light guide is arranged with a light exit surface thereof in parallel with the light exit surface of the first camera module.

* * * * *